INVENTORS
EDWARD P. DRISCOLL
HOWARD T. WALTHER
THEIR ATTORNEY

United States Patent Office 3,199,180
Patented Aug. 10, 1965

1

3,199,180
WEATHERSTRIP FASTENER INSTALLATION
Edward P. Driscoll and Howard T. Walther, Dayton, Ohio, assignors to General Motors Corporation, Detroit, Mich., a corporation of Delaware
Filed Oct. 9, 1963, Ser. No. 315,002
20 Claims. (Cl. 29—208)

This invention relates to automatic machinery or apparatus to install fasteners on vehicle weatherstrips with a minimum of labor and time regardless of spacing between locations for fastener installation.

Elastomeric sealing strips can be extruded and provided with fastener receiving structure using machines which can even form fastener receiving apertures in a programed pattern of spacing therebetween. However, a problem exists in accurately installing fasteners as to irregularly spaced apertures. Manual insertion of individual fasteners as well as semi-automatic installation can result in problems of timing and proper fitting of fasteners in irregular locations. Accordingly, it is an object of the present invention to provide equipment for progressively feeding both fasteners and weatherstrip means subject to machine finding a whole or aperture in the sealing strip and filling thereof with a plastic head nail-like fastener device.

Another object of this invention is to provide apparatus having in combination a nail-feeding means as well as a spindle or rod-like member which can be shifted to and fro axially between a fastener pick-up location and a position alignable with aperturing in weatherstrip means subject to at least partial turning of the spindle or rod-like member which causes engagement of the plastic nail fastener to the weatherstrip means accurately and efficiently at differing rates of operation of a driving variable speed motor means.

Another object of this invention is to provide equipment capable of finding pre-drilled aperturing in extruded weatherstrip means and fitting headed nail fastening devices therein regardless of irregular spacing between aperturing locations in accordance with the cam programing operation including first cam means for brief air blast to clear strip surfacing adjacent to an aperture, second cam means for a nail-loaded spindle to advance into alignment with a sealing strip means subject to subsequent spindle over travel to release a nail fastening device, third cam means for effecting at least limited spindle rotation during nail head fastener installation as to aperturing of weatherstrip means, fourth cam means for raising and lowering an aperture engaging index pin or finger portion, a nail-fastener-feeder cam that controls fitting of a fastening nail stem to the spindle, and finally a further cam means to effect sealing strip clamping during semirotative nail installation as well as to effect progressive movement of the weatherstrip by engaging a subsequent aperture with the pin or finger portion that progressively moves the weatherstrip which is indexed to have another aperture in an installation position.

A further object of this invention is to provide a plastic nail fastener installation including use of a feeder mechanism on which pre-apertured weatherstrip means is fed longitudinally along a track or support in alignment with a pivotally journaled carriage having a downwardly extending index finger portion to fit and engage weatherstrip aperturing for progressing the weatherstrip means a predetermined distance to a location wherein nail inserting means is effective after index finger retraction therefrom to return to finding the next aperture.

Another object of this invention is to provide in combination a fastener device feeding means, and insertion spindle moveable axially as well as rotatively into predetermined positioning between fastener loading and inserting operations, a guide track and clamping jaw arrangement for pre-apertured extruded weatherstrip means, and an indexing mechanism including an aperture-location progressive indexing finger portion all drivingly associated with a variable speed motor means.

Further objects and advantages of the present invention will be apparent from the following description, reference being had to the accompanying drawings wherein preferred embodiments of the present invention are clearly shown.

Equipment in accordance with the present invention can be used effectively for installation of fastening devices to weatherstrip means of a type disclosed by copending applications S.N. 71,463-Beck et al. filed November 25, 1960, now Patent 3,110,938 issued November 19, 1963, S.N. 290,007-Roode et al. filed June 24, 1963 as well as S.N. 300,982-Moorman et al. filed August 9, 1963. Features of the present invention represent improvements in equipment over that previously disclosed by copending applications S.N. 118,836-Lyday et al. filed June 22, 1961, now Patent 3,139,674 issued July 7, 1964 and S.N. 126,419-Harris et al. filed June 22, 1961. The present equipment as well as that previously disclosed can be used to install fastening devices having fastener structure per se as disclosed by copending application S.N. 118,918-Moorman also filed June 22, 1961, now Patent 3,139,784 issued July 7, 1964.

Figure 1:
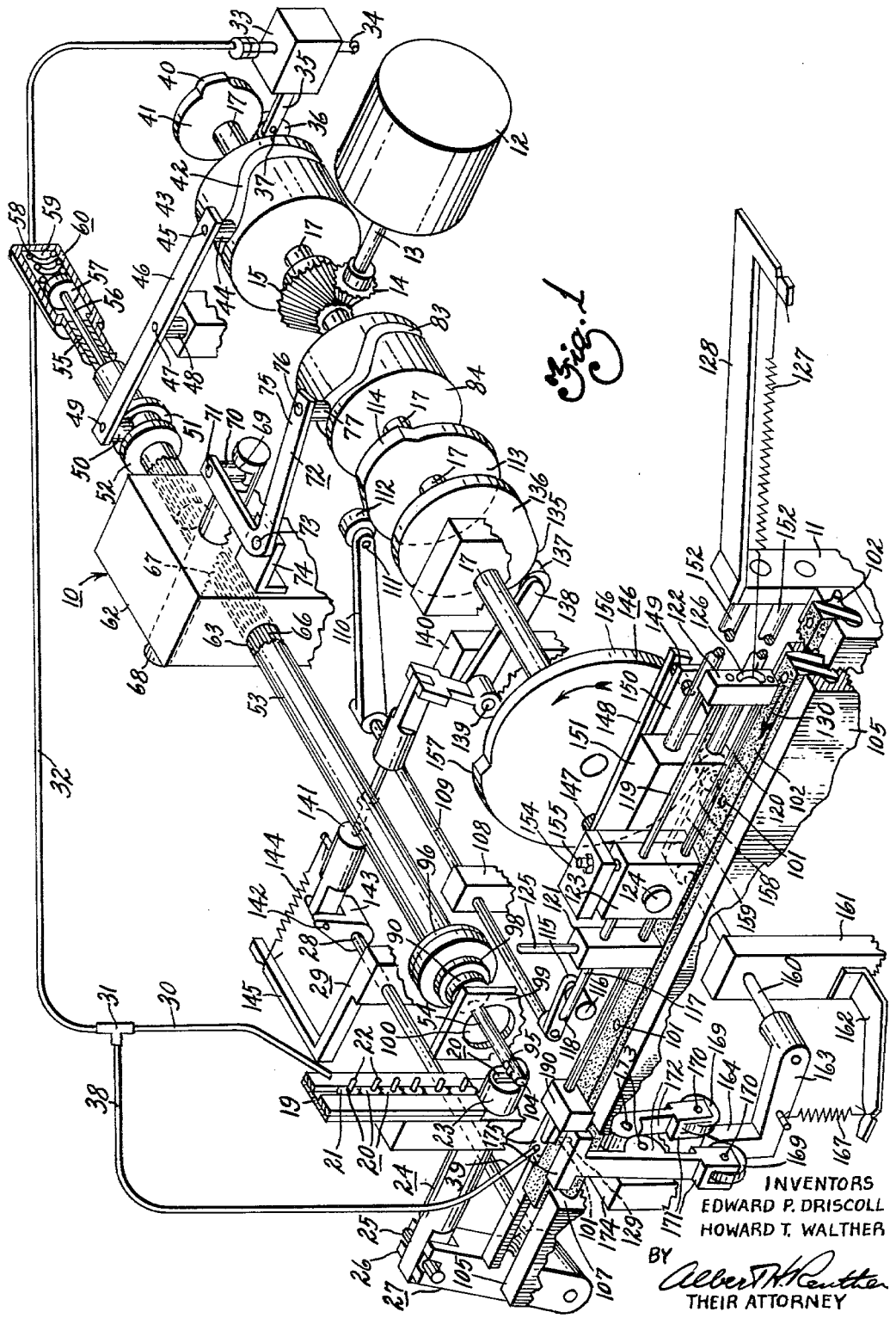
FIGURE 1 is a schematic perspective view of apparatus having features in accordance with the present invention for weatherstrip fastener installation.

Equipment or apparatus for weatherstrip fastener installation can be seen in a schematic perspective view of FIGURE 1 wherein such machinery is generally indicated by numeral 10. The machinery or apparatus 10 can include a base or frame on which various components to be described can be supported. The base or frame per se is indicated by numeral 11 in views of FIGURES 2, 3 and 4. A variable speed motor means 12 is mounted or carried suitably by this base or frame and can be electrically energized in a well-known manner at differing speeds or rate of rotation of a shaft 13 shown in FIGURE 1 for driving engagement of bevel gears 14 and 15 shown in FIGURE 1. Such gears 14–15 can be housed in a protective case 16 visible in views of FIGURES 2 and 3.

Figure 5:
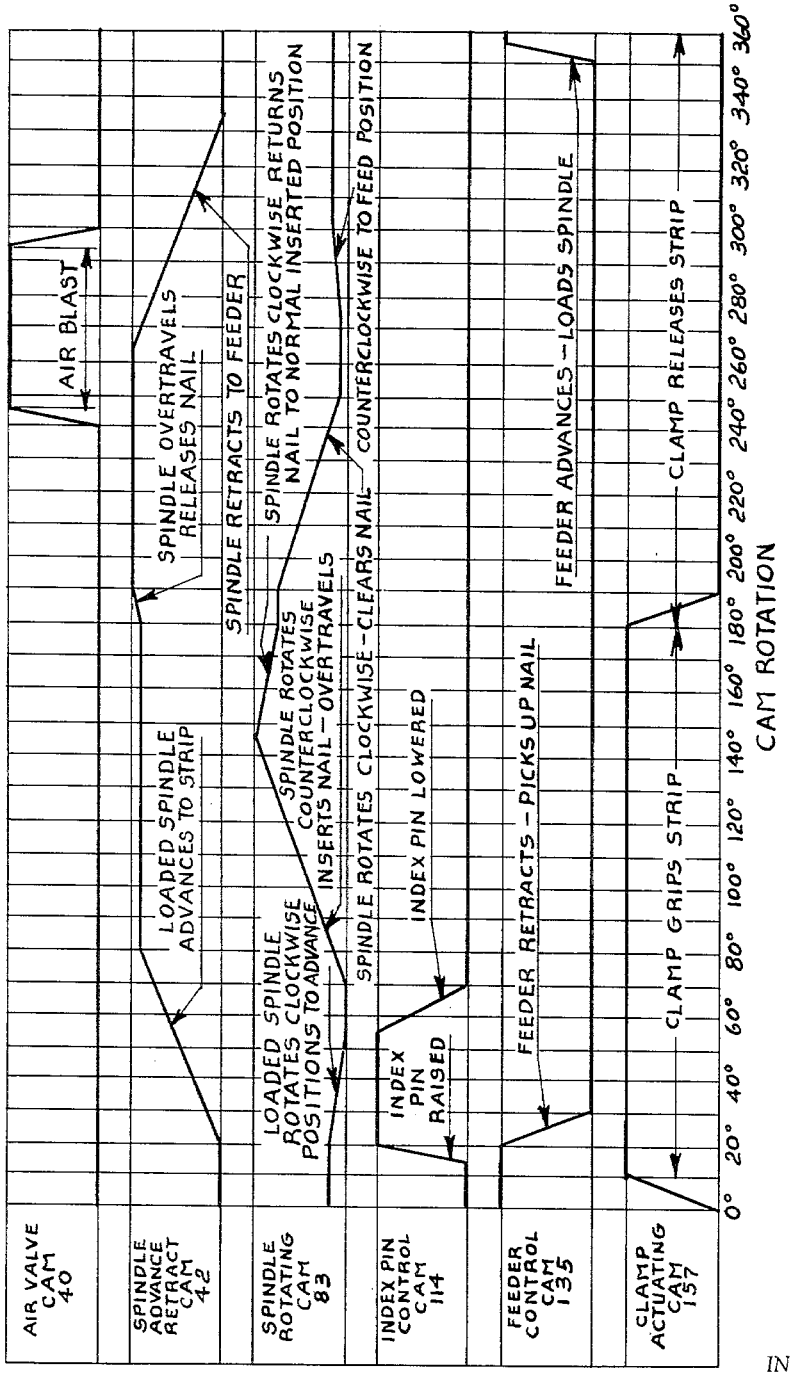
FIGURE 5 is a diagram illustrating sequences of operation of components of the apparatus of FIGURE 1.

The bevel gear 15 is suitably secured such as by a spline or Woodruff key to a main operating shaft portion 17 carrying plural cam means for programed operation in accordance with a diagram of FIGURE 5 illustrating sequential functioning of components of apparatus in accordance with the present invention.

Figure 2:
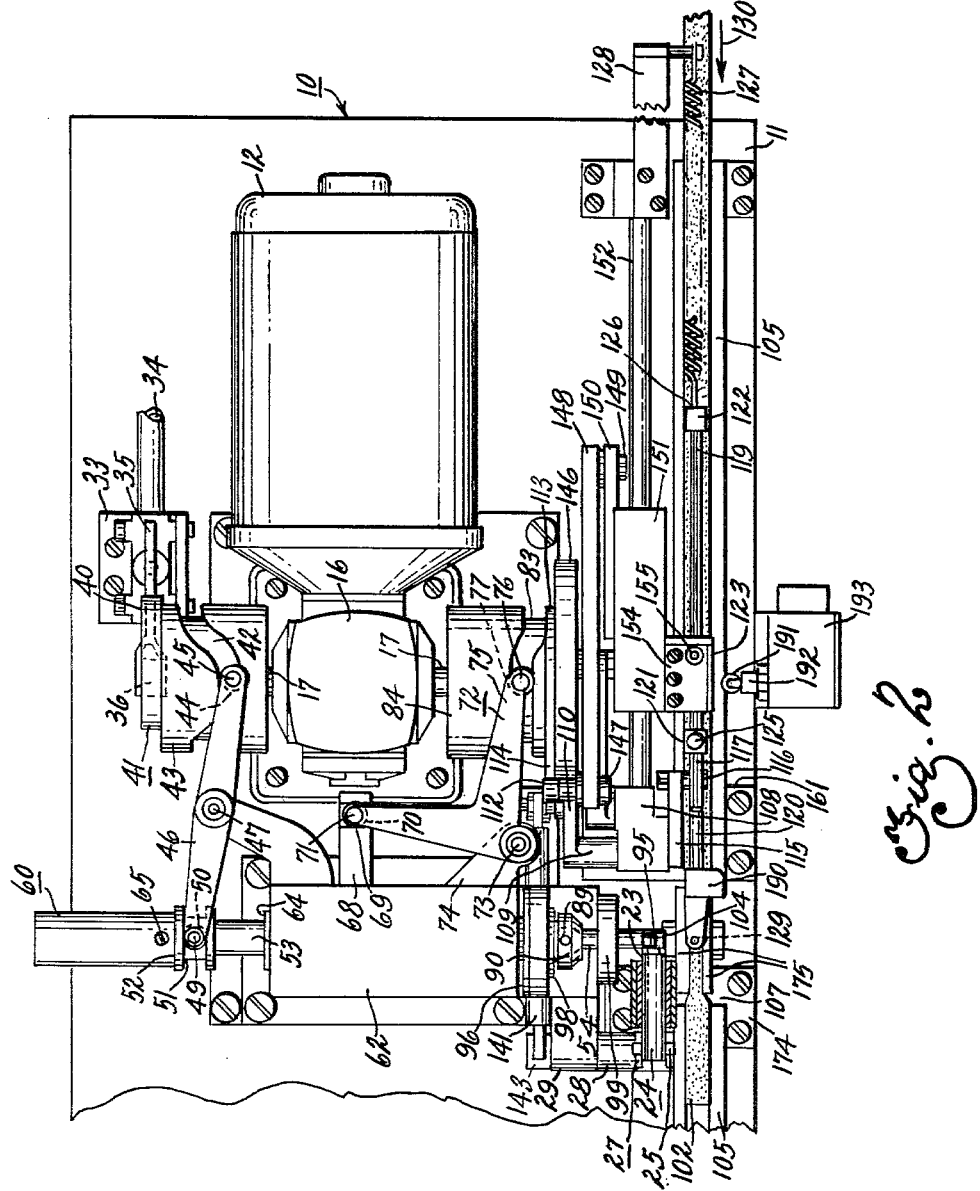
FIGURE 2 is a fragmentary plan view of apparatus of FIGURE 1.
Figure 3:
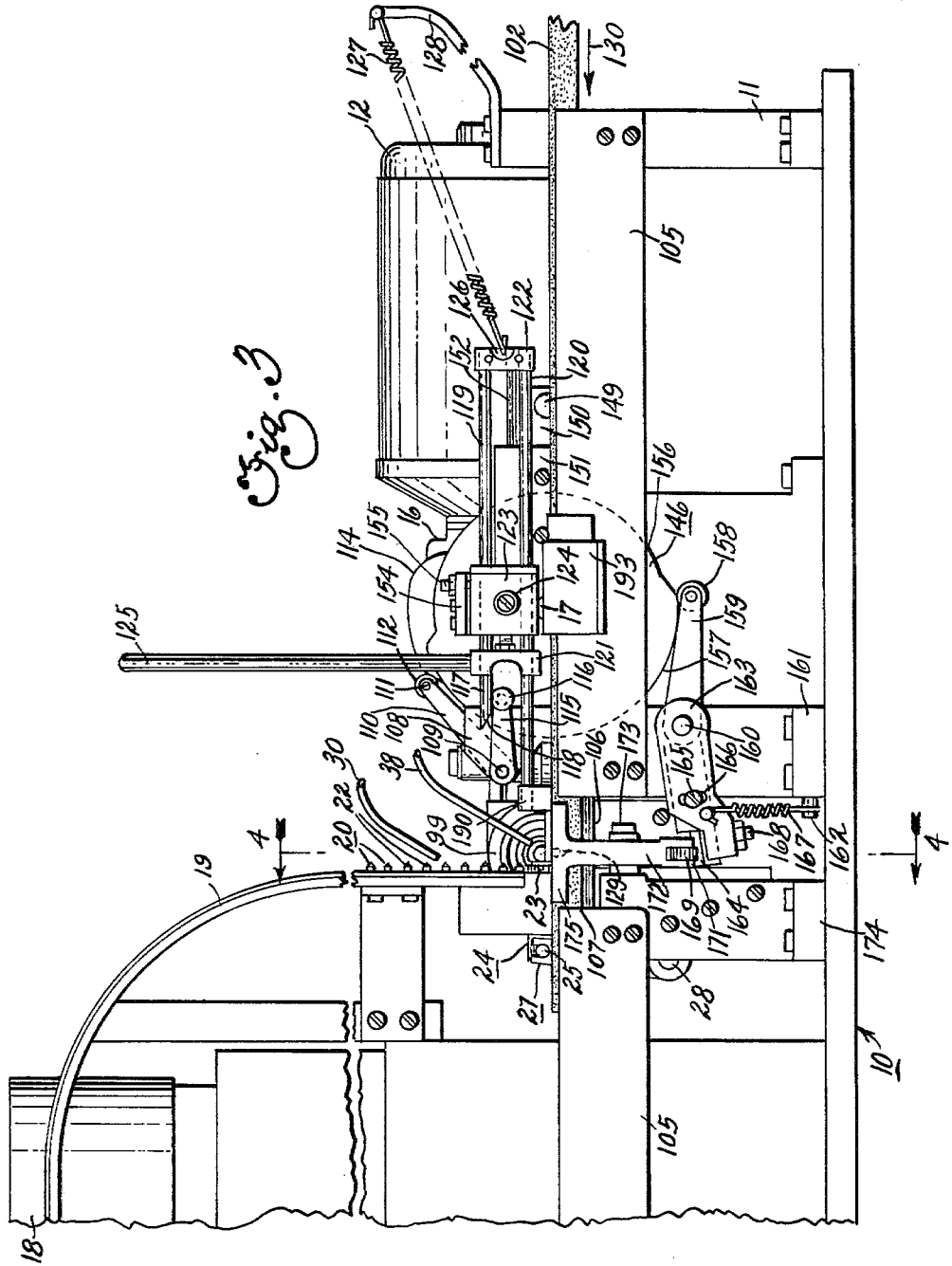
FIGURE 3 is a fragmentary side view of apparatus of FIGURE 1.
Figure 4:
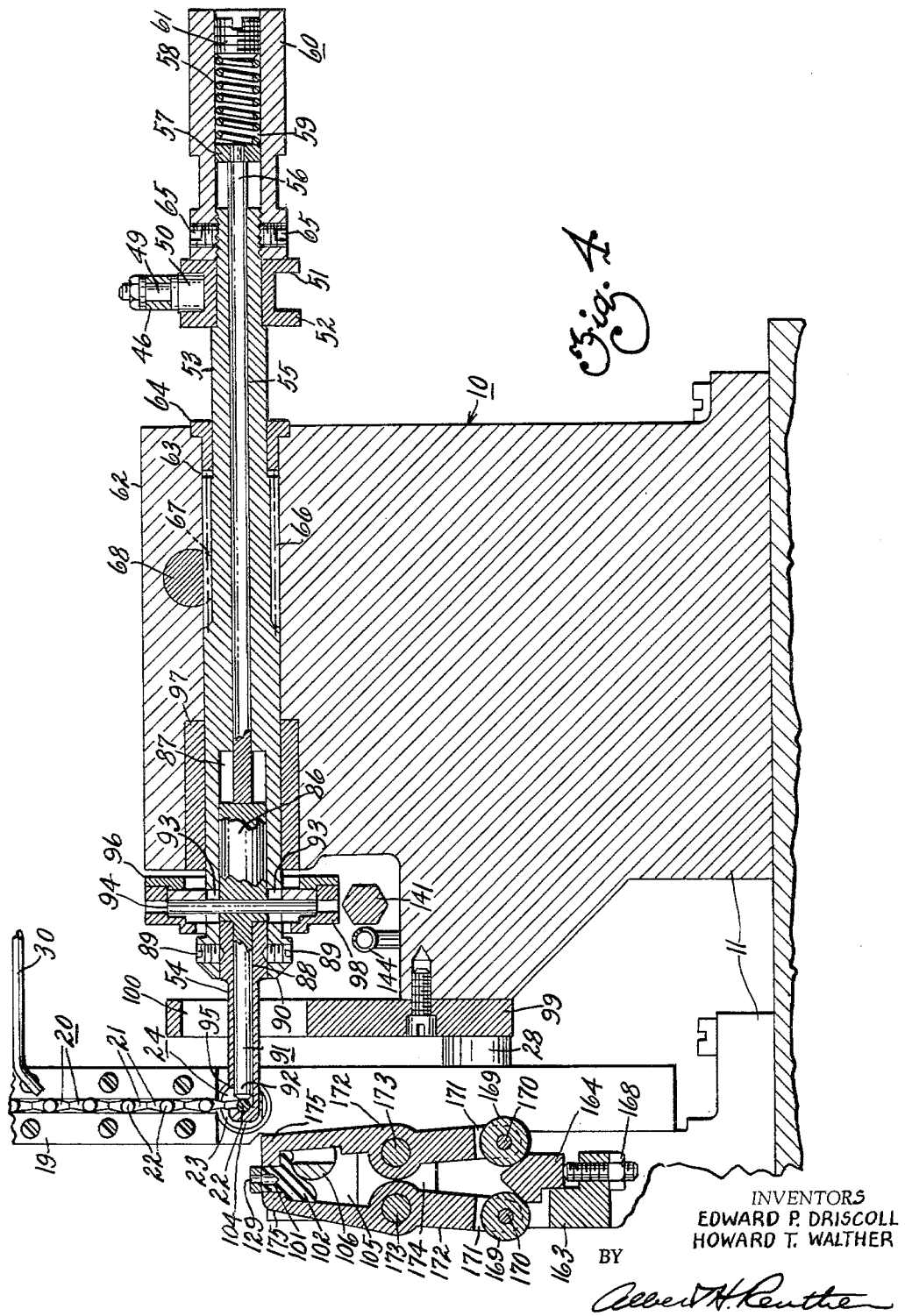
FIGURE 4 is a cross-sectional view taken along line 4—4 in FIGURE 2.

A vibratory bowl feeding device 18 partially visible in FIGURE 3 can be provided in a well-known manner to have a track 19 shown at least partially in views of FIGURES 1, 3 and 4. Fastening devices generally indicated by numeral 20 as shown in FIGURE 1 can include a head portion 21 as well as a stem portion 22 having specific configuration disclosed in copending applications mentioned earlier herein. The track 19 has a T-shaped passage to permit sliding movement of the fastening devices 20 into a final feed-finger station or shiftable end 23 of a reciprocable cylinder or member 24 journaled at an opposite end by a pivot pin 25 which engages a bifurcated ending 26 of a lever 27 on one end of a shaft 28 suitably supported and journaled by a bracket 29. Operation of this shiftable cylinder or member 24 will be described more fully in a following portion of this disclosure. However, it is to be understood that in one position this moveable cylinder has a channel or groove complementary to that of the track 19 such that a head portion 21 of a fastening device 20 can be transferred thereto subject to shifting of positioning of this head held temporarily by the T-shaped configuration of the ending 23 into a position out of alignment with the track 19 as indicated in FIGURE 1. As an aid for feeding of the fastening devices 20 adjacent to a lower terminus of the track 19 there can be provided a tube or conduit 30 joined by a T-shaped juncture 31 to a supply line 32 from a valve means 33 joined by a further pipe 34 to a suitable source of fluid medium under pressure. This pressurized source of fluid medium or compressed air is not shown though it is to be understood that the control valve means 33 is actuated by a link or lever 35 having a roller 36 rotatably supported thereon by a pin 37. A further conduit 38 having an open end 39 can also be supplied with pressurized fluid medium or compressed air by way of the juncture 31 and supply line 32. In any event, the roller 36 can engage an offset or lobe 40 of a first air-valve-operating cam means 41 carried and secured to one end of the operating shaft 17 noted earlier. This air valve subassembly can be seen best in views of FIGURES 1 and 2 and reference can be made to the diagram of FIGURE 5 indicating the relative position of rotation during which an air blast is supplied to the conduit endings 30 and 39 which are visible in views of FIGURES 1 and 3.

A second cam means or path 42 can be provided on a further member 43 carried by the operating shaft 17 in a location adjacent to the first cam means 41. A roller 44 journalled by a pin 45 in one end of an arm 46 centrally pivoted about a pin 47 carried by a fixed post 48 on the frame can transmit proportionate movement to an opposite end at which a pin 49 journals a roller 50 engageable in a groove 51 of a member 52. This member 52 can be secured in a predetermined position on a cylindrical housing 53 having a reduced-diameter spindle ending 54 and a hollow interior or passageway 55 through which a rod 56 is axially moveable. One end of the rod 56 has an enlarged head or piston portion 57 thereon engaged by a coil spring means 58 retained for biasing purposes in a cavity 59 of a cylindrical body 60 internally threaded at at least one end thereof to receive a spring pressure adjusting member 61. The spring means 58 serves to bias the rod 56 normally in a direction toward the left as viewed in FIGURES 1 and 4. The spindle housing 53 is rotatably supported by a block portion 62 having a passage 63 therein as best seen in FIGURE 4 though indicated also in FIGURE 1. A suitable fitting 64 can be fitted to one end of this passage 63. Suitable set screws 65 can be provided to secure the cylindrical portion 60 to one end of the spindle housing 53. An axially extending spline portion or gearing 66 can be provided centrally along the spindle housing 53 and this spline portion 66 indicated also in FIGURE 1 can be in mesh or engagement with a geared rack portion 67 of a cylindrical member 68 which is moveable transversely of the spindle housing 53 in accordance with engagement of a notch 69 by a roller 70 secured by a pin 71 to one end of a bellcrank or elbow-shaped arm 72 centrally pivoted and journaled by a pin 73 extending upwardly from a flange 74 carried by the block portion 62. Another end 75 of the bellcrank 72 can have a pin 76 journaling a roller 77 engageable in a third cam means or path 83 in a member 84 also secured to the common shaft 17. This third cam means 83 can effect a limited rotating movement of the spindle housing 53 in a sequence of operation indicated in the diagram of FIGURE 5 and to be explained more fully subsequently herein.

Referring again to FIGURE 4, it is to be noted that the central rod portion 56 in a location remote from the spring means 58 has another enlarged end 86 thereof moveable to and fro within an end recess 87 of the spindle housing 53. This movement of the enlarged end 86 occurs in accordance with actuation or shifting of the spindle housing by way of the second cam means 42 and lever 46 effective upon the member 52 for axial shifting of the spindle housing 53 carrying a subassembly on one end thereof. This subassembly includes attachment of the spindle extension 54 having a reduced diameter as well as an end 88 thereof secured by suitable fastening means such as set screws 89 to a tapered ending 90 of the spindle housing 53. The rod portion 56 and enlarged end 86 thereof can include an extended gripping end 91 which fits telescopically and axially within the extension 54 of the spindle. An end 92 of the gripping portion 91 is shiftable into and out of engagement with a stem portion 22 of the fastener devices 20 which are fed from the track 19 to an end location 23 of the shiftable member 24 noted earlier. The spindle housing 53 has an enlarged transverse pair of openings 93 through which a smaller transverse rod or pin 94 passes. This rod or pin 94 is attached to or press fitted into tight engagement with the enlarged portion 86 such that limited relative movement can occur axially between the spindle housing-extension 91 having the end 92 thereof engageable with the stem 22 which fits transversely into a lateral opening 95 of the spindle extension 54. Confines of the openings 93 limit movement of the transverse pin 94 thereby defining stops for to and fro relative movement between the spindle housing and extension 53–54 and the axially moveable internal components thereof. The subassembly on the end of the spindle housing 53 further includes an annular stop plate 96 engageable against one end of the block portion 62 having a sleeve 97 therewith for bearing purposes. An opposite annular plate or member 98 serves as a stop engageable to limit movement in an opposite direction in accordance with positioning of a bracket 99 having a passage 100 therethrough. This bracket 99 can be secured to the frame or support 11 as indicated in FIGURE 4. Thus, movement of the spindle means 53–54 is limited to occur between positioning of the lateral opening 95 in alignment with the stems 22 fed along the track 19 for transfer thereof to have an oblong head portion 21 of a fastening device 20 moved to a position in alinement with an aperture or hole 101 drilled or otherwise suitably formed transversely into an underside or surface of an elastomeric body portion of a weatherstrip means 102 shown in views of FIGURES 1 through 4 of the drawings. It is to be noted that a closed off end 104 of the spindle extension 54 and the end 92 serve to engage each stem portion 22 of fastener means 20 individually while an elongated head portion 21 of each fastener means is located to one side thereof externally of the lateral opening 95. Suitable resilient material such as feed fingers of durable plastic or metal can be provided in the terminal end 23 of the member 24 to permit resilient release of an individual head portion 21 upon retraction of the member 24 laterally away from the opening 95. The biasing of the spring means 58 provides sufficient strength between the end 92 and the portion 104 of the spindle extension 54 to assure firm retention and clamping of an individual fastening device 20 once transfer is effected from the end position 23. The second cam portion 42 has a predetermined configuration to transmit and cause a limited overtravel of the spindle housing 53 and extension 54 thereof such that the closed off end 104 moves axially away from the end 92 for release of a stem portion after a head portion 21 has been fitted into an aperture or hole 101 due to a clockwise rotation of the spindle for a substantially 180° turning movement during which a rocker-type action occurs for fitting the head portion 21 into the aperture or hole 101. This rocker-type and fitting of the fastener devices to a weatherstrip means thereby can be understood more fully by reference to copending application S.N. 118,836-Lyday et al. filed June 22, 1961, now patent 3,139,674 issued July 7, 1964 and belonging to the assignee of the present invention as noted earlier.

The weatherstrip means 102 can be fed along a guide or track 105 having a continuous bottom or base portion 106 contour to complement at least a part of the ceiling strip means 102 subject to provision of an opposite lateral cutout 107 for a purpose to be noted subsequently herein. It is to be noted that the cutout 107 or interruption in the guide or track 105 is located substantially laterally or axially to one side of the subassembly or collet having the stop plate 98 engageable with the bracket 99. The guide or track 105 can be suitably secured to the frame or support 11 as indicated in FIGURES 2 and 3. Also secured to the frame or support there is a vertically positioned brace 108 apertured to journal a rod 109 having a lever 110 secured to one end thereof as indicated in FIGURE 1. This lever 110 has a pin or pivot 111 on which a roller 112 is rotatably mounted or secured for rotative movement as to the lever. The roller 112 engages an outer periphery of a member 113 having a fourth cam means or outward lobe 114 therewith that imparts a rocking movement of a predetermined extent for turning of the rod 109 about the axis thereof as journaled by the brace 108 and causing a lever 115 on an opposite end of the rod 109 to shift a predetermined arcuate distance. This lever 115 includes an extension 116 which can be a pivotally journaled roller engageable with a free end 117 with a slanted surface 118 to enhance cooperation and enter engagement thereof. The end 117 is an extension of a rod 119 of an indexing mechanism which further includes a lower rod 120 substantially parallel to that having the end 117. This lower rod 120 as well as the upper rod 119 can be maintained in substantially parallel alignment to each other by vertical members 121 and 122 as well as an intermediate member 123 journaled to be tilted or slightly pivoted about an axis of a pin or shaft 124 shown in views of FIGURES 1 and 3. A lever or manual handle 125 can be provided on the one cross piece 121 and islet or anchor 126 for one end of a tension spring means 127 can be provided with the secondary bracket or cross piece 122 as indicated in views of FIGURES 1, 2 and 3. The tension spring means 127 can be anchored at an opposite end to a fixed extension 128 of the frame or base 11. Thus, the spring means 127 serves to bias and retract the indexing mechanism collectively including the upper and lower rods 119–120 as well as the cross pieces 121 and 122. The rods 119 and 120 are slideable axially through openings in the intermediate piece 123 subject to a rocking or pivoting action permitted about the axis of the shaft or pin 124. Such rocking action of the indexing mechanism is effective for moving an indexing finger or downward extending detent means 129 which is engageable into individual aperturing 101 of the sealing strip means 102. Thus, the cam or lobe portion 114 is in effect an index pin or finger control cam identified in the diagram of FIGURE 5 and effective for tilting or pivoting the indexing mechanism in a manner to effect positioning of the detent or finger 129 into and out of aperturing 101. The index pin control cam 114 is effective for a brief period for raising and disengaging the finger from a particular aperture or hole 101 once longitudinal force for progressively moving the weatherstrip means 102 in a direction of arrow 103 has been transmitted. Transmittal of the progressive feeding force will be described subsequently herein.

A further or fifth cam means 135 provided on a member 136 also secured to the operating shaft 17 can be best seen in the view of FIGURE 1, and this cam means has a roller 137 carried by a bellcrank 138 pivoted at 139 as to a support brace 140 carried by the frame to effect movement of an adjustable link 141 journaled at 142 to impart limited turning movement by way of a lever 143 to rod 28 which in turn causes shifting movement of the member 24 between positions in alignment with the track 19 from which the end 23 is shifted to a location adjacent to the opening 95 into which a stem 22 of a fastening device is inserted. A spring means 144 can be disposed between an extension 145 of support bracket 29 and the adjustable linkage 141 for biasing the member 24 effectively into a normal position in alignment with the track 19 and removed or retracted away from the opening 95 of the spindle means.

A sixth or feeder control cam member 146 can also be carried by the operating shaft 17. This feeder control cam 146 has a lateral extension 147 to which one end of a link 148 is pivotally attached such that an opposite end of the link can have a transverse pin 149 journaled therewith as well as being attached to an extension or bar 150 of a block 151 slideable as to fixed guide rods 152 which can be suitably joined to the frame or support such as 11 as indicated in FIGURE 1 as well as in FIGURE 2. A pair of such guides or rods 152 can be provided for stability and the block 151 can have a pair of complementary passages therein such that a sliding movement occurs in accordance with force transmitted by way of the link 148 between the pivots 147 and 149 during clockwise rotating movement of the sixth or feeder control cam 146. The operating shaft 17 terminates substantially flushed with one side of the cam member 146 so that there is sufficient clearance for movement of the lever or link 148 that imparts a shifting movement to the block 151 which in turn carries the pin 124 about which the intermediate portion 123 is pivotal though moveable therewith in a to and fro direction longitudinally of the guide 105 for the weatherstrip means 102. The block 151 can carry a supplemental L-shaped adjusting portion 154 having a suitable bolt and screw 155 therewith to provide a limit stop adjustable for the amount of pivotal movement of the intermediate portion 153 about the axis of the pin 124.

The cam member 146 has an outer peripheral surface 156 with a seventh cam portion 157 thereon engageable by a roller 158 journaled on a free end of a lever 159 as shown or indicated in views of FIGURES 1 and 3. This lever 159 is carried by a rod or shaft 160 suitably journaled by a bracket or support 161 having an extension 162 as indicated in views of FIGURES 1 and 3. An end of the rod or shaft 160 remote from the lever 159 carries an oppositely extending lever 163 having a wedge or end 164 extending upwardly therewith. A dowel or pin 165 can extend through a slot 166 of the lever 163 as indicated in FIGURE 3, the slot 166 can have an arcuate length to define a stop or limit for movement in opposite directions of the lever 163 carrying the wedge end 164 therewith. A spring means 167 can be fitted between a central lug of the lever 163 and the extension 162 as indicated in views of FIGURES 1 and 3. Thus, the wedge end 164 is biased normally downwardly due to force transmitted by the spring means 167 to the lever 163. The wedge end 164 can be fixed as indicated diagrammatically in FIGURE 1 or can have an adjusting means 168 therewith for differing settings as to the wedging action accomplished along the V-shaped portion only, or to extend to opposite sides of the lever arm beyond the V-shaped ending thereof. In any event, the wedge end portion 164 is engageable with complementary roller means 169 in pairs on opposite sides thereof and each journaled by pins 170 fitted through bifurcated ends 171 of complementary levers 172 which can be seen to be pivoted about a pair of pins 173 carried by a brace 174 as indicated in FIGURE 1. These levers 172 have a pair of complementary clamp ends 175 which snugly engage and hold the weatherstrip means 102 in a predetermined location as to the gap 107 noted earlier thus providing a station for insertion of the fastening devices 20 by the rocking action of the spindle means transmitted by the spindle housing 53 having the racks 67 engaging a splined or geared outer periphery 66 as noted earlier. This rocking motion is transmitted by way of the transverse pin 94 in the collet or subassembly portion of the spindle means though this pin 94 permits limited axial shifting of the central rod 55 and extension 91 as noted earlier. The end of the tube or conduit 39 is located adjacent to this station to one side of the clamp portions 175 such that in the event any fastening device 20 should be inadvertently dropped into this location the air blast can clear away such a loose fastening device or any other foreign material from the vicinity of the hole or aperture 101 forwarded to the insertion station by force transmitted through the indexing mechanism by way of the finger or pin as noted earlier. A suitable hollow conduit or discharge tube not shown in the drawings can be located to one side of the air blast for transmitting such fastening devices or other foreign material away from such an aperture cleared for insertion of a properly fed fastening device transmitted from the track 19 by way of the shiftable end 23 of member 24 to the lateral opening 95.

During operation of the apparatus or automatic plastic nail fastener assembly machine the nails or fasteners are loaded loosely into the vibratory bowl feeding device 18 which orients the fastening devices in a well-known manner and feeds them into the track 19. These nails or fastening devices can be fed through an escapement individually or in multiples subject to forwarding to the feed-finger shiftable ending 23 of the member 24 which effects lateral movement of a fastening device having a stem 22 thereof projecting laterally to be insertable through the opening 95 and engageable between the end 104 of the spindle extension 54 and the end 92 of the shiftable internal rod extension 91. A weatherstrip means such as 102 can be extruded continuously on separate equipment and can be subjected to precise drilling operations of apertures or holes 101 also on a separate machine or on a differing location. Use of a separate machine from its proper presetting of irregularly spaced holes so that more and more closely spaced fastening devices can be located on one side of the weatherstrip means for insertion as to corner portions of a cover or a door assembly to be fitted to a motor vehicle. For example, more fastening devices are to be fitted around corners of a vehicle door as well as around corners of a vehicle trunk lid so that leakage of rain water and dust can be hindered and so that wind noise can also be avoided more effectively.

The strip indexing finger 129 is placed manually into the first pre-drilled hole 101 of a weatherstrip means by having an operator tilt or pivot the indexing mechanism by use of the handle 125. The indexing finger then progresses the weatherstrip means to a point at or near the center line of the collet or subassembly on the spindle means. The clamping jaw portions 175 then close and hold the weatherstrip means 102 for the assembly of the plastic headed nail or fastening device subjected to the rocking or limited rotating movement for stretching the sides of the aperturing 101 to permit entry of the oblong head though the stem 22 projects laterally from the sealing strip means. The stem is subsequently fitted through an aperture panel of a vehicle body or door panel and the like.

The indexing finger 129 is then automatically lifted from the hole to permit insertion of the nail due to interaction of the components of the index in control cam 114 effective to transmit a limited arcuate movement to the roller 116 engageable with the end 117 having the end 118 thereon. At the time the indexing finger 129 is automatically lifted from the hole while one in the work station the spring means 127 continues to bias the finger into engagement with surfacing of the weatherstrip means while the block 151 as driven from the journaled connection to the cam link 148 retracts and returns until automatically the finger resiliently drops into the next or subsequent hole 101. Also during this operation the assembly collet previously loaded with a fastening device 20 moves from a position in alignment with the track 19 into a position in alignment with the sealing strip 102. A rotating action in a clockwise direction of substantially 180° or 182° results in assembly of the head portion of the plastic nail-like fastening device into the pre-drilled hole in the weatherstrip means. The spindle and assembly collet then automatically releases the nail by slight overtravel of the spindle assembly and separation of the ending 104 from the end 92 of the central rod. The spindle and assembly collet is then retracted and returned to the loading position again in alignment with the track 19 from which fastening devices can be transferred by the shiftable end 23 of the member 24. Cycling of the components is represented in the diagram of FIGURE 5 and this is automatically repeated until all of the holes of a particular length of weatherstrip means have been filled with fastening devices.

The variable speed motor means 12 can be adjusted to regulate speed of the strip and assembly operations of the apparatus in accordance with the present invention.

It is to be noted that the cam arrangement of FIGURE 1 diagrammatically sets forth the operations involved and that one or more cam functions could be combined on a single member carried by the operating shaft 17. A rate of insertion in a range between 60 and 100 or more plastic nails or strokes per minute can be achieved using the apparatus in accordance with the present invention, and this is considerably faster than any attempts at manual insertion of such fastening devices. Furthermore, the machine installation of such fastening devices using the equipment of the present invention is considerably more accurate and efficient. The weatherstrip means can be cut to differing lengths, and pre-drilling operations can be set for programed formation of lateral apertures 101 regardless of irregular spacing thereof. Such weatherstrip means regardless of length can be fed to the equipment in accordance with the present invention and plastic nail-like fastener devices will be installed automatically therein. It is to be noted that the indexing finger 129 can have a block 190 therewith engageable against a roller 191 of a shiftable arm 192 of a stop switch means 193 as indicated in FIGURE 2. Thus, at any time when the finger 129 should miss an aperture, or whenever the weatherstrip means has been completely fitted with fastening devices and there are no further installations to be made, the apparatus can be automatically shut down pending subsequent use thereof. The switching means 193 can be electrically connected with the electric motor means 12 in any suitable manner. Also it is to be understood that a rheostat or speed setting device can be provided with the motor means 12 in a well-known manner.

The rocker action of the spindle end can be both clockwise and counterclockwise though preferably the spindle continues to move in a clockwise direction of rotation so that a stem portion 22 can clear away from the spindle during the rocking action. Generally one operator can handle the functioning of one or more of the subject installation machines which can be operated adjacent to each other simultaneously. Thus, a mass production operation and installation of such fastening devices can be readily achieved. Provision of the fastener feeding means, insertion spindle movable axially as well as rotatively into predetermined positioning between fastener loading and inserting operations, the guide track and clamping jaw arrangement for the pre-aperture extruded weatherstrip means, as well as the indexing mechanism in combination therewith assures a successful and highly efficient operation. It is to be noted that the indexing finger 129 can be limited as to the movement thereof longitudinally to shift the apertured sealing strip means 102 for a predetermined distance once the aperture has been located and the indexing mechanism can be adjusted as to the length and positioning such that the aperture into which a fastening device is to be inserted will always be stopped in a clamped position between the jaws 175 substantially in alignment with the axis of the spindle and rod therewith.

While the embodiments of the present invention as herein disclosed constitute preferred forms, it is to be understood that other forms might be adopted.

What is claimed is as follows:

1. An assembling machine capable of finding predetermined aperturing in elongated weatherstrip means and fitting headed fastener devices therein regardless of irregular spacing between aperturing locations, comprising, frame means for supporting in cooperative relationship components including a weatherstrip guide and fastener feeding means mounted substantially laterally adjacent to each other, a spindle means having a fastener transfer end movable between differing axial positioning coinciding with locations of said fastener feeding means and weatherstrip guide means, cam-operated means to shift fastener devices from said feeding means to said spindle means end, power means to impart rotative movement to said spindle means end having a fastener device therewith being fitted where headed into weatherstrip means aperturing and programed for the rotative movement when said spindle means end is aligned with said weatherstrip guide means, and an indexing mechanism supported to have a pivotal finger portion engageable with individual aperturing of the weatherstrip means progressively shifted thereby to move as programed for successive fastener installation.

2. The assembling machine of claim 1 wherein said spindle means has a lateral opening adjacent to the movable end, and an axially shiftable inner rod portion has an ending adjacent to the lateral opening for engagement of individual stemming of fastener devices.

3. The assembling machine of claim 1 wherein said spindle means has a lateral opening adjacent to the movable end, and an axially as well as telescopically shiftable inner rod portion having an ending adjacent to the lateral opening for engagement of individual stemming of fastener devices, said shiftable inner rod portions being cam controlled and spring biased for resilient retention of fastener devices subject to removal thereof during said rotative movement of said spindle means end.

4. The assembling machine of claim 1 wherein said spindle means has a lateral opening adjacent to the moveable end, and an axially shiftable inner rod portion having an ending adjacent to the lateral opening for engagement of individual stemming of fastener devices, said spindle means carrying an enlarged collet portion including a transverse pin means therein that limits shifting of said rod portion internally, said collet externally being engageable with a fixed projection for stopping axial shift of said spindle end into alignment with said weatherstrip guide means.

5. The assembling machine of claim 1 wherein said spindle means has a lateral opening adjacent to the moveable end, and an axially shiftable inner rod portion has an ending adjacent to the lateral opening for engagement of individual stemming of fastener devices, said spindle means carrying an enlarged collet portion including a transverse pin means therein that limits shifting of said rod portion internally, said collet externally being engageable with a fixed projection for stopping axial shift of said spindle end into alignment with said weatherstrip guide means, said spindle means including a housing having axial splines thereon in a journaled location to one side of said collet and remote from said spindle means end and a cam-operated rack portion in mesh with said axial splines for imparting said rotative movement of said spindle means end.

6. The assembling machine of claim 1 wherein said spindle means has a lateral opening adjacent to the moveable end, and an axially shiftable inner rod portion having an ending adjacent to the lateral opening for engagement of individual stemming of fastener devices, said spindle means carrying an enlarged collet portion including a transverse pin means therein that limits shifting of said rod portion internally, said collet externally being engageable with a fixed projection for stopping axial shift of said spindle end into alignment with said weatherstrip guide means, said spindle means including a housing having axial splines thereon in a journaled location to one side of said collet and remote from said spindle means end, and a cam-operated rack portion in mesh with said axial splines for imparting said rotative movement of said spindle means end, though said spindle housing carries a pulley to which cam-actuated axial shifting force is transmitted subject to stop engagement of said pulley to limit retracting movement of said spindle means end when positioned in alignment with said fastener feeding means.

7. The assembling machine of claim 1 wherein said indexing mechanism is resiliently biased into a retracted location away from fastener installing position of said spindle means end, said power means having connection to said indexing mechanism for periodically urging weatherstrip means along said guide means once said pivotal finger portion has engaged an individual aperturing.

8. The assembling machine of claim 1 wherein said indexing mechanism is resiliently biased into a retracted location away from fastener installing position of said spindle means end, said power means having connection to said indexing mechanism for periodically urging weatherstrip means along said guide means once said pivotal finger portion has engaged an individual aperturing, said indexing mechanism including a carriage slideable to and fro in a path substantially parallel to that of said weatherstrip guide means though a pivotal member journaled to said carriage can tilt a predetermined distance sufficient for clearance of said finger portion away from the weatherstrip means under urging of a separate cam lever therewith.

9. Apparatus having in combination a fastener-feeding means for supply of fastener devices to a loading position and frame means for supporting in cooperative relationship components including a fastener transfer member moveable to and fro substantially transversely of ending of said fastener-feeding means, a spindle means moveable both axially and rotatively from a loading location to an inserting position, said spindle means having a fastener carrying end configuration, a weatherstrip guide means having a path in register with the inserting position of said moveable spindle means, an indexing mechanism including a pivotable finger portion also in alignment with the path of said weatherstrip guide means, a power means and multiple camming driven thereby for programed operation of said fastener transfer member, said spindle means, and said indexing mechanism with said finger portion.

10. The combination apparatus of claim 9 wherein a fluid pressure jet means is directed to said inserting position along said weatherstrip guide means for clearance of unwanted material in the vicinity of aperturing to be fitted with a fastener device.

11. The combination apparatus of claim 9 wherein fluid pressure jet means direct a clearing force for fastener device supply adjacent to said spindle means.

12. The combination apparatus of claim 8 wherein said weatherstrip guide means has a continuous weatherstrip bottom support particularly at the inserting position on opposite sides of which a pair of clamping members are provided and cam operated by said power means.

13. The combination apparatus of claim 9 wherein said power means is variable as to speed for an installation rate of between 60 and 120 fastener devices per minute.

14. On an assembling machine capable of finding predetermined though irregularly spaced aperturing in elongated weatherstrip means and fitting headed fastener devices therein, a power programming means, comprising, frame means for supporting in cooperative relationship components including a first cam means for brief air blast to clear weatherstrip surfacing adjacent to aperturing, second cam means for fastener-loaded spindle advancement into alignment with a weatherstrip guide subject to subsequent spindle over travel to release the fastener device, third cam means for effecting at least limited spindle rotation during fastener device installation as to weatherstrip aperturing, fourth cam means for raising and lowering an aperture engaging index pin, a fastener feeder cam that controls fitting a fastener stem to the spindle, and further cam means to effect weatherstrip clamping laterally thereof during semi-rotative fastener installation as well as to effect progressive movement of the pin in engagement with another weatherstrip aperture into an installation position.

15. For use on an assembling machine to install headed fastener devices in aperturing of an elongated resilient weatherstrip means, an indexing mechanism, comprising, frame means for supporting in cooperative relationship components including a frame-supported carriage located to one side of a weatherstrip guide means, a member pivotally secured to said carriage, and a finger portion projecting from said pivoted member capable of being moved longitudinally of the weatherstrip guide means.

16. The mechanism of claim 15 wherein said pivoted member has a cam-engageable extension for effecting tilting and pivotal movement of said finger portion out of engagement with weatherstrip aperturing once progressive movement thereof to a fastener installing position is attained.

17. The mechanism of claim 15, wherein said pivoted member has a manually engageable lever therewith for initial fitting of said finger portion into first weatherstrip aperturing.

18. The mechanism of claim 15 wherein said pivoted member has a pair of rods therethrough, one of said rods having a tilt-cam-engageable tapered end and said other of said rods having said finger portion on a free end thereof as well as a stop means resiliently retractable with said carriage thereby to trip a power turnoff switching means adjacent to the weatherstrip guide means upon completion of fastener device installation into aperturing of the elongated resilient weatherstrip means.

19. In combination on apparatus to install fasteners on vehicle weatherstrips, frame means for supporting in cooperative relationship components including a headed fastener feeding means, a spindle member shiftable to and fro axially between a fastener pick-up location and an inserting position alignable with individual aperturing in the weatherstrip means subject to at least partial turning of said spindle member which causes engagement of the fastener to the weatherstrip accurately and efficiently at differing rates of operation, an indexing finger portion to progress the weatherstrip through the inserting position, programing control camming for said feeding means, said spindle member as well as said indexing finger portion, and a variable speed motor means to drive said programing control camming.

20. The combination of claim 19 wherein said control camming includes first cam means for brief air blast to clear weatherstrip surfacing adjacent to aperturing, second cam means for fastener loaded spindle advancement into alignment with the weatherstrip, third cam means for effecting at least limited spindle rotation during fastener installation as to weatherstrip aperturing, fourth cam means for raising and lowering said indexing finger portion, a fastener feeder cam that controls fitting a fastener stem to said spindle member, and further cam means to effect weatherstrip clamping laterally thereof during semi-rotative fastener installation as well as to effect progressive movement of said indexing finger portion in engagement with another weatherstrip aperture into an installation position.

References Cited by the Examiner
UNITED STATES PATENTS

| 2,797,818 | 5/55 | Page | 29—208 |
| 2,821,774 | 2/58 | Francis | 29—211 |
| 2,980,992 | 4/61 | Black | 29—208 |

WHITMORE A. WILTZ, *Primary Examiner.*

THOMAS H. EAGER, *Examiner.*